April 2, 1968  D. F. LEMONS  3,375,734
TRANSMISSION AND CONTROL THEREFOR
Filed July 18, 1966  2 Sheets-Sheet 1

INVENTOR.
DAVID F. LEMONS

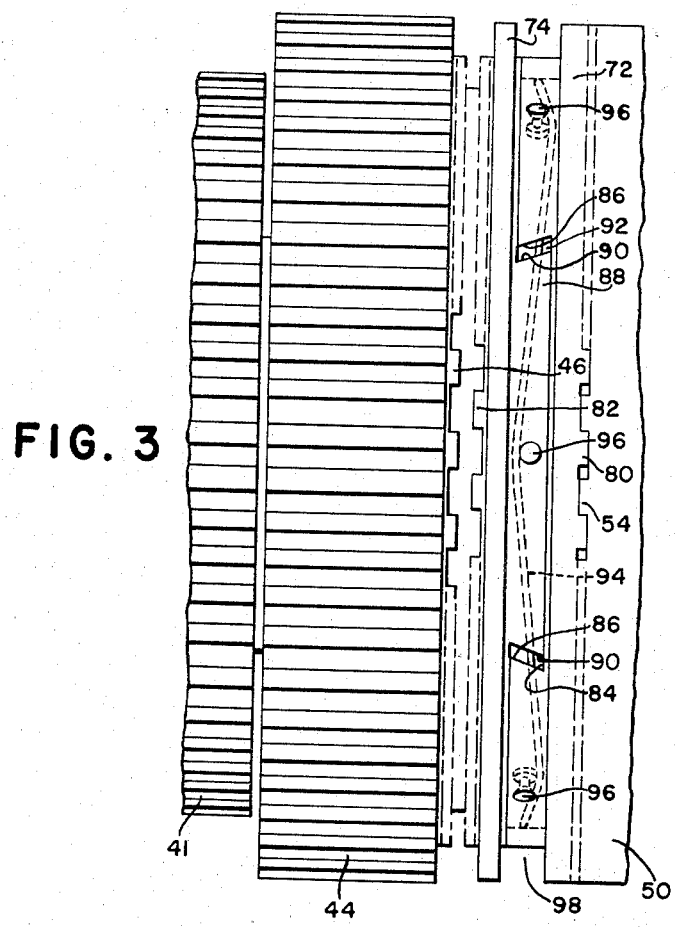
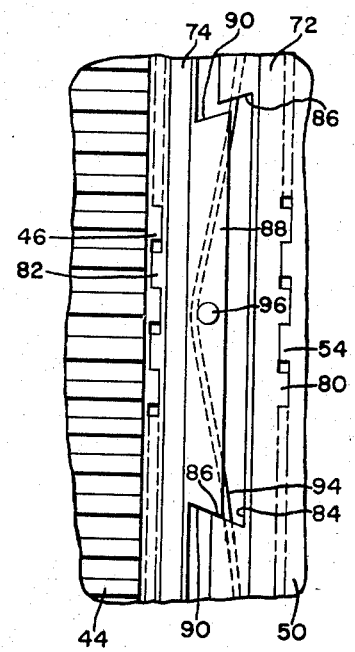
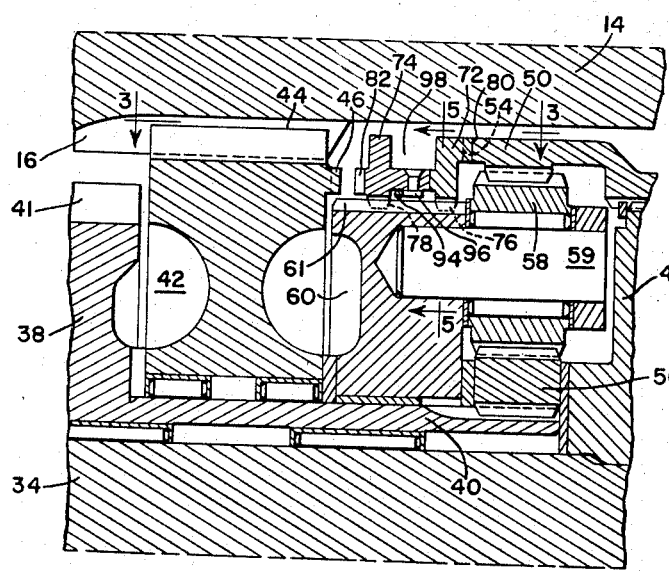

United States Patent Office 3,375,734
Patented Apr. 2, 1968

3,375,734
TRANSMISSION AND CONTROL THEREFOR
David Forrest Lemons, Cedar Falls, Iowa, assignor to Deere & Company, Moline, Ill., a corporation of Delaware
Filed July 18, 1966, Ser. No. 565,939
11 Claims. (Cl. 74—689)

This invention relates to a transmission, and more particularly to a novel collar-type coupling device for shifting the speed range of a combined infinitely-variable and planetary drive.

It is known to provide a three-element planetary-type transmission with dual inputs, and to control the speed of two of the elements to produce a wide variety of speeds in the third or output element, one of the inputs being an infinitely-variable drive to provide an infinitely-variable output speed within a limited range, while the planetary elements are selectively clutchable to each other or to the inputs to provide different speed ranges. Both friction and collar-type clutches have been utilized in such transmissions, the former generally being more complicated, expensive, and presenting a greater maintenance problem, while the latter have generally required a torque interruption during the shift, which is undesirable in certain applications, such as in agricultural tractors and the like.

The primary object of the present invention is to provide an improved collar-type clutch for alternately connecting one transmission member to other members without a torque interruption during the shift. A more specific object is to provide such a collar-type clutch for selectively connecting planetary elements to each other or to alternate inputs in a dual input combined planetary and infinitely-variable transmission. Another object is to provide such a collar-type clutch utilizing a pair of clutch collars mounted on one transmission member and respectively simultaneously engaging two other transmission members during the shifting of the transmission to prevent a torque interruption, and further to provide means for positively disengaging one of the clutch collars as soon as the two other members rotate at a non-synchronous speed to prevent a transmission lockup. Still another object is to provide such a clutch of simple and rugged construction, inexpensive to manufacture and maintain, and further to provide such a clutch having specific utility in a heavy-duty transmission wherein the shifting of the clutch collars occurs when the three transmission members are rotating at the same speed.

These and other objects inherent in the invention will become apparent from the following detailed description and accompanying drawings wherein a preferred embodiment of the invention is disclosed, the figures of the drawings being described below.

FIG. 2 is an enlarged fractional section, showing a portion of the planetary gear train and the collar shift mechanism.

FIG. 3 is a plan view of a portion of the transmission, as seen generally along the line 3—3 of FIG. 2.

FIG. 4 is similar to FIG. 3, showing a portion of the collar shift during the shifting sequence.

Figure 1:
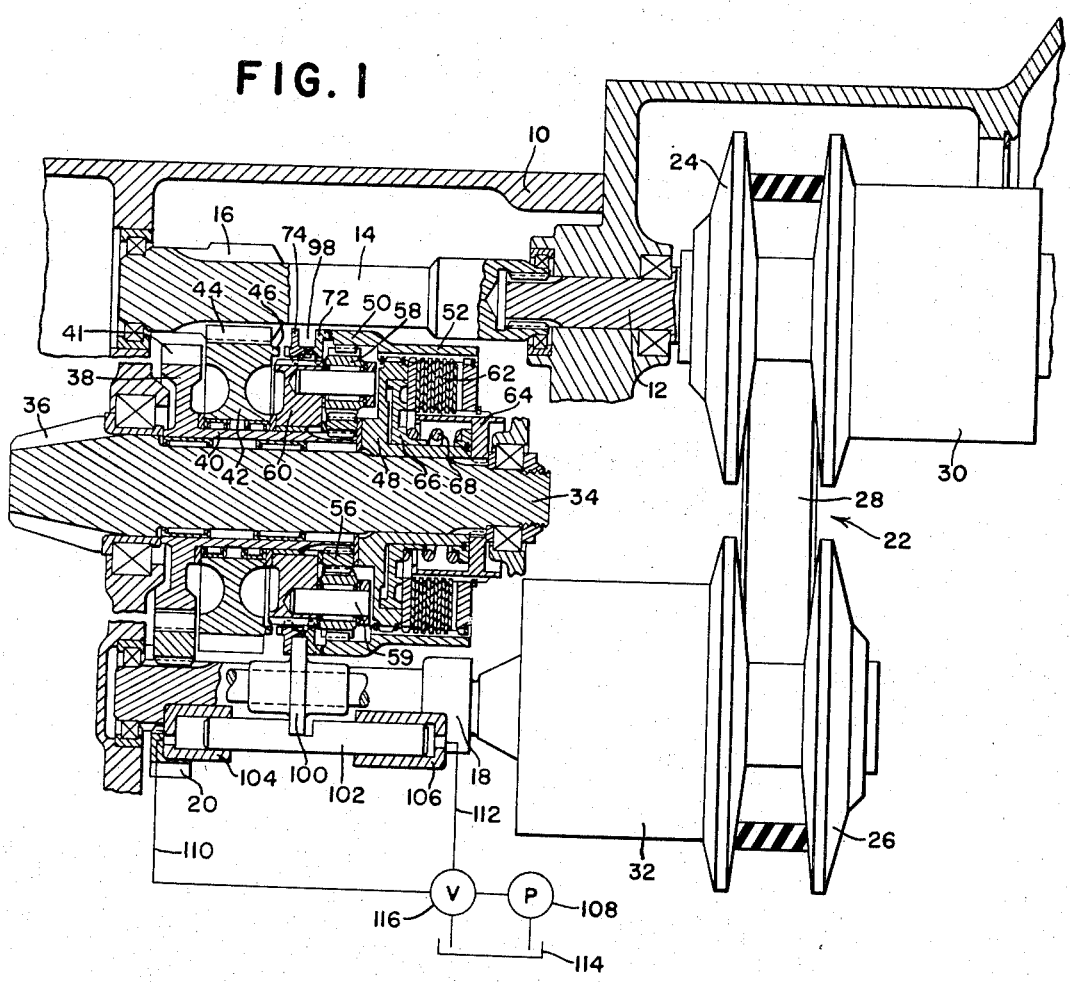
FIG. 1 is a longitudinal, chiefly sectional view of the transmission, shifted into high range, schematically showing the transmission controls.

The transmission chosen for purpose of illustration includes a housing 10, only a portion of which is shown, and a shaft 12, which is journaled in the housing and, in a conventional agricultural tractor, extends rearwardly from and is driven by an internal combustion engine (not shown), generally governed to operate at a constant speed. The shaft 12 includes a rearwardly extending portion 14, which forms a spur gear means 16 at its rearward end. The above orientation is established for the purpose of clarity only, and it is to be understood that such words as "afore-and-aft," "upwardly," "downwardly," "forwardly," or "rearward" are not to be construed as limiting the invention. Moreover, it is not intended to limit the invention to the particular transmission illustrated, since the invention could be utilized in various applications.

Also journaled in the housing 10, parallel to and offset from the engine-driven shaft 12, is a variable-speed shaft 18, which carries a spur gear 20 at its rearward end and is connected to the engine-driven shaft 12 by a variable-speed drive, indicated in its entirety by the numeral 22, including a variable-diameter drive sheave 24 coaxially affixed to the shaft 12, a variable-diameter driven sheave 26 coaxially affixed to the shaft 18, and an endless belt or driving element 28 interconnecting the sheaves 24 and 26 to drive the shaft 18 at an infinitely variable speed relative to the shaft 12 within a limited range, the diameters of the sheaves 24 and 26 being respectively established in a known manner by control cylinders 30 and 32.

An output shaft 34 is also journaled in the housing 10 parallel to and between the shafts 14 and 18 and includes an output gear 36 at its rearward end. An annular input member 38 is coaxially journaled on the output shaft 34 and includes a forwardly extending sleeve portion 40 and a peripheral spur gear means 41, which meshes with the gear 20 to drive the input member 38 at a speed which varies with the speed of the shaft 18. A constant-speed input member 42 is coaxially journaled on the sleeve portion 40 and includes a peripheral gear means 44 meshing with the engine-driven shaft gear 16 to drive the input member 42 at a constant speed relative to the engine speed. The forward radial face of the member 42 has a ring of forwardly extending teeth 46.

Also coaxially journaled on the output shaft 34 is a support member 48 which coaxially carries a planetary ring gear 50, having a forwardly extending annular portion 52 and a ring of rearwardly extending teeth 54, which are approximately opposite and similar to the teeth 46. A planetary sun gear 56 is coaxially splined to the forward end of the variable-speed input member sleeve 40, and a plurality of planetary pinions 58 constantly mesh with the ring gear 50 and the sun gear 56 and are mounted on pinion shafts 59 carried by a planetary carrier element 60, which is journaled on the input member sleeve portion 40 between the constant-speed input member 42 and the sun gear 56 and includes a plurality of axially extending splines 61 equally spaced around its outer periphery, the circumferential spacing between the splines being substantially greater than the circumferential dimension of each spline, the outer periphery of the carrier being similar to a conventionally splined member with every other spline missing (FIG. 5).

Friction plates 62 are alternately splined to the forwardly extending annular portion of the ring gear 50 and to a hub 64 coaxially attached to the output shaft 34 and are normally pressed into engagement by an annular piston 66 acting against a spring 68 in response to fluid pressure in the chamber between the piston and the support member 48. When the clutch plates 62 are engaged, the ring gear 50 is drivingly connected to the output shaft.

Figure 5:
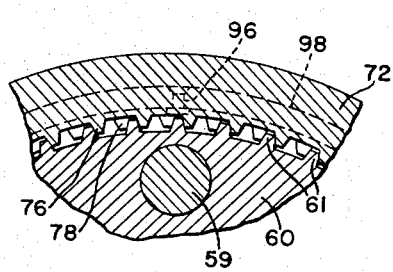
FIG. 5 is a fractional section as seen generally along the line 5—5 of FIG. 2.

Forward and rearward annular coupling members or clutch collars 72 and 74 have internal splines 76 and 78 respectively and are coaxially mounted on the periphery of the carrier 60, the splines 76 and 78 meshing with the carrier splines 61 to permit fore-and-aft sliding movement of the clutch collars on the carrier while permitting only a small degree of relative rotation between the clutch collars and the carrier because of the circumferential spacing of the splines 76, 78, and 61 (FIG. 5). The forward collar 72 includes a forward ring of teeth 80 engageable with the teeth 54 on the ring gear 50, and the rearward clutch collar 72 has a rearward ring of teeth 82 engageable with the teeth 46 on the input member 42. The forward collar 72 has in its rearward face a plurality of radial grooves 84 having opposite circumferentially spaced sides tapered inwardly and rearwardly to form opposite cam surfaces 86. The rearward clutch collar 74 has a plurality of radial keys 88 respectively opposite the grooves 84 and provided with inward and rearward tapers forming cam surfaces 90 parallel to the opposite cam surfaces 86, the keys 88 fitting the grooves 84 with a relatively small circumferential clearance 92 provided between the opposite cam surfaces 86 and 90 to permit relative axial movement between the clutch collars. While the preferred embodiment includes three mating grooves and keys equally spaced angularly, any practical number could be utilized. A single spring wire 94 extends around the inner periphery of the clutch collars between the splines 76 and 78 and is woven around radial pins 96 alternately extending inwardly from the keys 88 and the forward collar 72, exerting a relatively small force biasing the clutch collars 72 and 74 toward one another. The clutch collars 72 and 74 respectively form the forward and rearward sides of a circumferential groove 98 around and between the clutch collars. The groove 98 accommodates a shifter member 100 which axially shifts the clutch collars and is actuated by a piston 102 movable forwardly or rearwardly in response to fluid pressure at its rearward or forward ends respectively in rearward and forward cylinders 104 and 106, the pressure in said cylinders being supplied by a fluid pressure source 108 via hydraulic lines 110 and 112 respectively, said lines being alternately connected to a fluid pressure source 108 and an associated reservoir 114 by control valve means 116. Each clutch collar is restrained or moved by the shifter 100 in only one direction, i.e., away fom the opposite clutch collar.

The collar-type coupling device operates as follows. The engine-driven shaft 12 and consequently the shafts 14 and 18 are driven in a counterclockwise direction as viewed from the forward end of the transmission. Consequently the input members 38 and 42 are driven in a clockwise direction, the gearing and the variable-speed drive means 22 being such that the minimum speed of the variable-speed input member 38 is slightly less than the speed of the constant-speed input member 42. The operation of the transmission in high and low range is substantially identical to the transmission shown in U.S. Patent No. 3,251,243. When the transmission is operating in high range, as shown in the drawings, the shifter 100 is in its forward position and the forward clutch collar 72 connects the planetary ring gear 50 to the planetary carrier 60 to lock up the planetary gear train so that the planetary ring gear 50 rotates at the same speed as the variable-speed input member 38 and the planetary sun gear 56 attached thereto. Thus, in high range, the output shaft 34 is positively connected to and driven by the variable-speed shaft 18.

If a speed in the low range is desired, the ratio in the variable-speed drive means is reduced to substantially the shift point ratio wherein the speeds of the input members 38 and 42 are substantially synchronous. The shifter 100 is then actuated rearwardly to move the rearward collar 74 into engagement with the constant-speed input member teeth 46, as shown in FIG. 4. At synchronous speed, or when the variable-speed drive is slightly above synchronous speed, the torque is still transmitted through the forward clutch collar 72, the torque load maintaining the collar 72 in engagement with the ring gear 50 so that the collars 72 and 74 separate axially. The speed of the variable-speed input member is then reduced to a point slightly less than synchronous speed so that the rearward clutch collar 74 takes over the torque transmission from the collar 72. After the torque load has been lifted from the collar 72, the bias of the spring 94 is normally sufficient to pull the collar 72 out of engagement with the ring gear teeth 54 and back into engagement with the collar 74.

The "hand-off" type of torque transmission during the shifting sequence provides a realtively smooth range shift without torque interruption. Of course the above torque hand-off could also be achieved by shifting the collar 74 after the speed of the variable-speed input member 38 is slightly less than the speed of the constant-speed input member 42, although the shift would not be as smooth.

In low range, the slightly lower speed of the variable-speed input member produces a slightly higher output speed, so that after the torque hand-off, the ring gear 50 is driven at a slightly higher speed, the variation from synchronous speed preferably being very slight so that the speed change during shifting is imperceptible. If, due to friction between the teeth 54 and 80, the force of the spring does not pull the forward collar 72 out of engagement with the ring gear 50, as shown in FIG. 4, the forward collar will be driven at a slightly higher speed than the speed of the rearward collar, the relative rotation between the collars causing engagement of the cam surfaces 86 and 90 on the collars 72 and 74 respectively and consequent camming of the forward collar 72 toward the rearward collar 74 and out of engagement with the ring gear 50.

The substantial backlash between the carrier splines 61 and the internal splines 76 and 78 of the clutch collars permits sufficient relative rotation between the clutch collars to accomplish the above-described camming action. As best seen in FIG. 5, when both clutch collars are engaged, the internal splines 76 and 78 are adjacent to the opposite sides of each spline 61, permitting limited rotation between the clutch collars until the splines 76 and 78 are aligned on the same side of the carrier spline 61.

The positive camming action between the clutch collars thus prevents any possibility of transmission lockup due to continued simultaneous engagement of the clutch collars at non-synchronous speeds.

The clutching device is not limited in utility to the above-described transmission for it could be used in any application wherein it is required to mechanically connect one member with either of two alternate members. The device could even be used for shifts at non-synchronous speed, although this would not be practical on heavy-duty applications, since the components would not tolerate the almost instantaneous acceleration. Nor is the invention limited to arrangements wherein the torque through the clutch collars is in opposite directions in the high and low ranges of the transmission, as described above, for in an arrangement where torque through the collars is in the same direction in both transmission ranges, the internal splines 76 and 78 of the clutch collars 72 and 74 respectively could be provided so that they are axially aligned when the clutch collars are pulled apart, whereby relative rotation between the clutch collars in either direction would be accommodated.

When the terminal splines 76 and 78 are at opposite sides of the carrier splines 61, as shown in FIG. 5, a torque reversal through the transmission requires relative rotation between the collars 72 and 74, affecting the alignment of the collars and the cam surfaces 86 and 90, so that the collars cannot be separated. Thus, the transmission illustrated could not be shifted when the vehicle engine is being used to brake the vehicle. However, when the internal splines 76 and 78 are provided so that they are normally aligned, a torque reversal does not require relative rotation between the collars, the internal splines 76 and 78 being movable together to the opposite side of the splines 61, so that the alignment of the collars is not affected. Thus the collars could still be separated to begin a shift even during a torque reversal.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A transmission comprising: first, second, and third transmission members, coaxially journaled relative to each other; first and second coupling members respectively mounted on the third transmission member for rotation therewith and axially shiftable thereon between neutral and engaged positions wherein the first and second coupling members respectively drivingly connect the first and second transmission members to the third transmission member, the coupling members being mounted on the third transmission member for a relatively small degree of limited rotation relative thereto and relative to each other; and cam means operably interconnecting the coupling members when both coupling members are in their engaged positions to positively shift the one coupling member into its neutral position in response to a relative rotation between the coupling members.

2. The invention defined in claim 1 wherein the first and second transmission members have toothed portions and the first and second coupling members also have toothed portions respectively meshing with the first and second transmission member toothed portions in their engaged positions.

3. The invention defined in claim 2 and including spring means operably interconnecting and biasing the coupling members toward one another.

4. The invention defined in claim 3 wherein the third transmission member has a plurality of axially extending splines on its outer periphery and the coupling members are annular in shape and have a plurality of internal splines on their inner periphery meshing with the third transmission member splines, the internal and external splines having a substantial backlash to permit a relatively small degree of relative rotation between the clutch members and the third transmission member.

5. The invention defined in claim 1 and including a first and a second drive means operatively connected to the first and second transmission members respectively to drive the first and second members at different or synchronous speeds.

6. The invention defined in claim 1 and including a first drive means operatively connected to the first transmission member to drive it at a relatively constant speed, and a second drive means operatively connected to the second transmission member to drive it at a variable speed, including a synchronous speed with the first transmission member.

7. The invention defined in claim 6 wherein the second transmission member is a planetary ring gear, the third transmission member is a planetary carrier, and the second drive means includes a planetary sun gear, and planetary pinion means journaled on the planetary carrier and constantly meshing with the ring gear and sun gear.

8. In a transmission having an engine-driven shaft, a first input element connected to and driven by the engine-driven shaft, a planetary gear train including first, second, and third planetary elements coaxial with the input element and planetary pinion means carried by one planetary element and constantly meshing with the other two, an output element, and variable-speed drive means connecting the first planetary element to the engine-driven shaft to drive said element at variable speeds relative thereto, including a synchronous speed with the first input element, the combination therewith of coupling means for selectively coupling one of said elements to either of two other elements, comprising: first and second coupling members mounted on one transmission element for rotation therewith, the first coupling member being axially shiftable thereon between an engaged position wherein it operably engages another transmission element to transmit a torque between said elements and a neutral position, the second coupling member being axially shiftable on said element between an engaged position, wherein it operably engages a third transmission element to transmit a torque between said elements, and a neutral position, and shifter means operably connected to said coupling members to shift one coupling member into its engaged position when the input members are substantially at synchronous speed and while the other coupling member is in its engaged position, the shifted coupling member picking up the torque transmission from the other coupling member after the shift is accomplished.

9. The invention defined in claim 8 and including connecting means operative between the coupling members for shifting said other coupling member to its neutral position after the torque transmitted by said member is relieved.

10. The invention defined in claim 9 wherein the coupling members are adjacent coaxial clutch collars and the connecting means includes a spring means operative between the clutch collars to bias the collars toward one another.

11. The invention defined in claim 10 wherein the clutch collars are mounted on said element for a small degree of rotation relative thereto and relative to each other, and the connecting means includes cam means interacting between the clutch collars when both clutch collars are in their engaged position to positively shift the torque relieved clutch collar to its neutral position in response to a small degree of relative rotation between the clutch collars.

References Cited

UNITED STATES PATENTS

| 2,439,079 | 6/1948  | Davidson | 74—740   |
|-----------|---------|----------|----------|
| 2,719,442 | 10/1955 | O'Leary  | 74—740 X |
| 2,733,795 | 2/1956  | Christie | 192—108 X|
| 2,933,952 | 6/1960  | Schou    | 74—689   |
| 3,251,243 | 5/1966  | Kress    | 74—689   |

DONLEY J. STOCKING, *Primary Examiner.*

ARTHUR T. McKEON, *Assistant Examiner.*